April 8, 1941.  E. LIHOTZKY  2,237,943
INTERMEDIARY OPTICAL SYSTEM FOR MICROSCOPES
Filed July 12, 1939
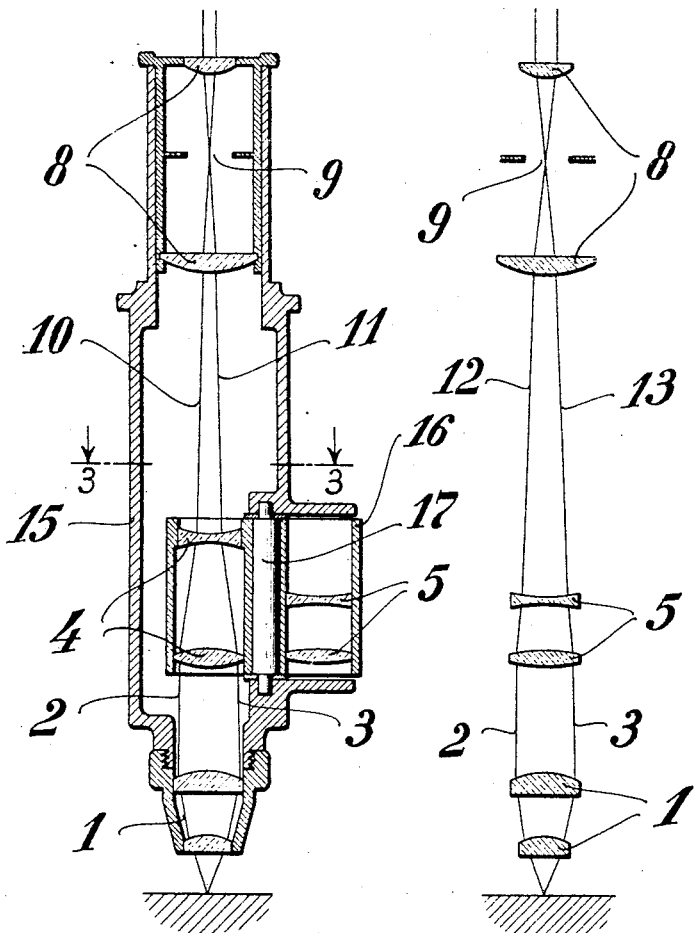
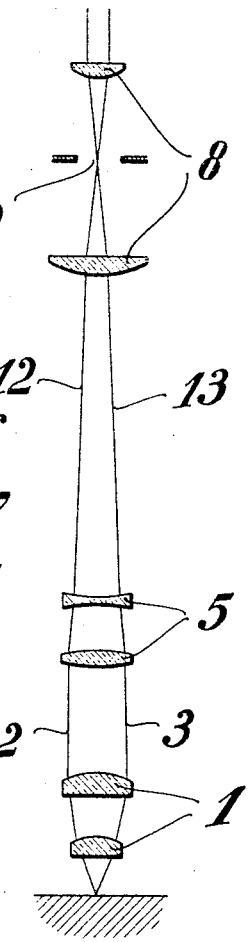
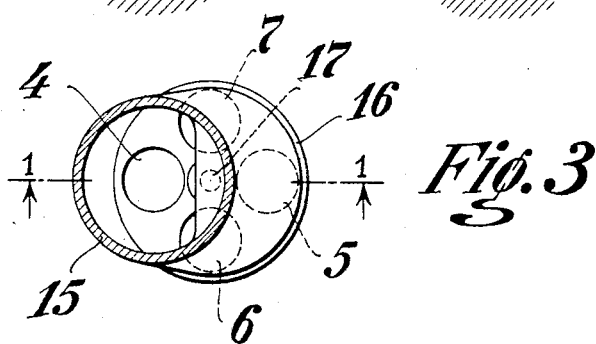
INVENTOR
Erwin Lihotzky Patented Apr. 8, 1941

2,237,943

UNITED STATES PATENT OFFICE 2,237,943

INTERMEDIARY OPTICAL SYSTEM FOR MICROSCOPES

Erwin Lihotzky, Wetzlar, Germany, assignor, by mesne assignments, to Frank Dumur, Lausanne, Switzerland Application July 12, 1939, Serial No. 284,000
In Germany July 16, 1938

1 Claim.  (Cl. 88—39)

This invention relates to microscopes and the broad object of the invention is to improve the construction of the miscroscope by providing it with means, such as an optical intermediary system, whereby optical defects such as chromatical differences of magnification, curvature of the image or astigmatism and other defects are eliminated or materially reduced.

A conventional compound microscope consists of two optical systems namely the objective and the ocular or eyepiece. These two systems carry the entire burden of the optical performance of creating the magnified image of the object. In constructing microscopes the endeavor is to create a magnified image free from optical defects. However, it is known, that the combined performance of the objective and the ocular in a microscope do not eliminate all optical defects in a wholly satisfactory manner or to a fully satisfactory degree. For instance, even the best type of objective, the Apochromat, is not free from the defect known as chromatical difference of magnification. Attempts have been made to compensate for this defect by using so-called compensating eyepieces, but such compensation or correction is accompanied by a sacrifice in the size of the field of view. Also objectives with a high numerical aperture form images with an unduly high curvature of the field. Moreover, a change in magnification can only be accomplished by changing either the objective or the eyepiece in which case it is of course necessary to interrupt the observation until such change has been made.

One object of this invention is to provide an optical intermediary system to be positioned in a microscope between the objective and the eyepiece whereby optical defects such as chromatical difference of magnification, curvature of the image, or even astigmatism and other defects are eliminated or materially reduced.

Another object of the invention is to provide for a plurality of interchangeable optical intermediary systems for other purposes, such for instance, for the purpose of changing the total magnification of the miscroscope without necessitating changing either the objective or the eyepiece.

Still another object is to provide means for a continuing changing of the distance between the individual optical members of the optical intermediary system in the direction of the optical axis for the purpose of accomplishing a continuing change of the magnification of the total microscope.

The invention is embodied in an optical intermediary system consisting of at least two optical elements, such as lenses. One of these elements must possess a negative refractive power at least as high as the sum total of the positive refractive powers of the other elements in the system. Or the negative refractive power of the said one element may be even greater than the sum total of all the refractive powers of the elements in the system. Also, the elements in the system must be separated by an air space.

The invention is diagrammatically illustrated in the accompanying drawing in which—

Fig. 1 is a vertical sectional view of a microscope embodying the invention taken on the line 1—1 of Fig. 3.

Fig. 2 is a diagram illustrating the path of the light rays through a certain portion of the intermediary system and the microscope different from the path of the light rays shown in Fig. 1.

Fig. 3 is a horizontal sectional plane view taken on the line 3—3 of Fig. 1.

The microscope illustrated in Fig. 1 comprises the microscope tube 15 with an ocular 8 and an objective 1. In the microscope tube there is mounted a housing 16 pivoted on a shaft 17. The housing contains in this instance four intermediary optical systems designated 4, 5, 6 and 7. Each of these intermediary systems consists of at least two optical elements as shown. One of these elements has a negative refractive power at least as high as the sum total of positive refractive powers of the other elements of the optical intermediary system. Or the negative refractive power of the said one element may be even greater than the sum total of all the refractive powers of the elements in the optical intermediary system. The two elements are separated by a relatively large air space.

The bundle of light rays originating in one object point which pass through the objective 1 are defined by the rays 2 and 3 in the drawing. Without an intermediary optical system these rays will converge at a point, not illustrated. However, as shown in Fig. 1, by interposing an optical intermediary system, for instance the system 4, the paths of the rays 2 and 3 are changed and the rays emerge from the intermediary system in the directions indicated by the rays 10 and 11. The image of the object is now formed in the lower focal plane 9 of the ocular 8. Likewise, as seen in Fig. 2, the rays 12 and 13 emerging from another intermediary system 5 also converge and meet in the focal plane 9 but under a different angle so that the images formed in the focal plane are of different sizes or dimensions.

The plane 9 may coincide with the plane in which the rays 2 and 3 would meet if there are no intermediary optical systems or said planes may not coincide.

It will be seen that by rotating the housing 16 about the shaft 17 any one of the optical intermediary systems 4, 5, 6 and 7 may be brought into optical alinement with the optical axis of the microscope. Hence, an intermediary optical system designed to produce a particular degree of magnification or designed to eliminate or correct optical errors under particular circumstances may be selected and by simple rotation of the housing 16 brought into operative position within the microscope.

By varying the distance between the two members of the intermediary optical system, it is possible to cause certain changes of the total magnification of the microscope whereby the relative positions of object and image are not changed at all, or at least changed only to a negligible degree.

It will be understood from the foregoing that this invention adds new optical systems to the microscope which new systems participate in or perform part of the burden of creating a magnified image free from the optical defects pointed out above and also provide added facilities for observation.

The intermediary systems 6 and 7 are characterized by the features described in connection with the systems 4 and 5 and are therefore not separately illustrated.

I claim:

In a microscope consisting of a microscope tube, an ocular and an objective therein, means for magnifying the image of an object to a degree different from the magnification formed by said objective alone, said means comprising a shaft journaled in the wall of said microscope tube at a point between said ocular and objective, a housing secured to said shaft, a plurality of intermediary optical systems carried by said housing, the optical axes of said systems being parallel to the optical axis of the microscope, each of said optical systems consisting of at least two optical elements separated by an air space, one of the optical elements in each of said systems having a relatively high negative refractive power compared with the sum total of all of the refractive powers of the optical elements in each of said systems, said housing being rotatably movable with said shaft whereby to selectively move any one of said plurality of optical systems into coincidental axial alinement with the optical axis of said microscope.

ERWIN LIHOTZKY.